United States Patent
Weber et al.

(10) Patent No.: US 8,757,285 B2
(45) Date of Patent: Jun. 24, 2014

(54) PORTABLE OSCILLATORY POWER TOOL WITH PLANETARY GEAR

(75) Inventors: Heinrich Weber, Schwaebisch Gmuend (DE); Juergen Blickle, Goeppingen (DE)

(73) Assignee: C. & E. Fein GmbH (DE)

(*) Notice: Subject to any disclaimer, the term of this patent is extended or adjusted under 35 U.S.C. 154(b) by 452 days.

(21) Appl. No.: 13/235,964

(22) Filed: Sep. 19, 2011

(65) Prior Publication Data
US 2012/0067607 A1 Mar. 22, 2012

(30) Foreign Application Priority Data
Sep. 17, 2010 (DE) .................... 10 2010 046 629

(51) Int. Cl.
*B24B 23/04* (2006.01)
*B25F 5/00* (2006.01)
*B23Q 5/04* (2006.01)

(52) U.S. Cl.
CPC . *B24B 23/04* (2013.01); *B25F 5/00* (2013.01); *B23Q 5/04* (2013.01)
USPC ............. 173/49; 173/216; 173/217; 451/356; 451/357

(58) Field of Classification Search
CPC ........... B24B 23/03; B24B 23/04; B25F 5/00; B25F 5/02; B23Q 5/04
USPC .................. 173/48, 49, 109, 162.1, 216, 217; 451/344, 356, 357
See application file for complete search history.

(56) References Cited

U.S. PATENT DOCUMENTS

| | | | | |
|---|---|---|---|---|
| 1,937,459 A | * | 11/1933 | Hill | 451/65 |
| 2,350,098 A | * | 5/1944 | Decker | 451/356 |
| 2,392,097 A | * | 1/1946 | Meunier | 477/19 |
| 2,526,976 A | * | 10/1950 | Smith | 74/44 |
| 3,874,125 A | * | 4/1975 | Stroezel | 451/356 |
| 4,322,921 A | * | 4/1982 | Maier | 451/357 |
| 4,845,898 A | | 7/1989 | Preis | |
| 5,425,666 A | * | 6/1995 | Frank et al. | 451/344 |
| 5,919,085 A | * | 7/1999 | Izumisawa | 451/357 |

(Continued)

FOREIGN PATENT DOCUMENTS

| | | |
|---|---|---|
| DE | 3630155 A1 | 3/1988 |
| DE | 10356068 A1 | 6/2005 |

(Continued)

OTHER PUBLICATIONS

German Search Report; Application No. 10 2010 046 629.8; Issued: Apr. 6, 2011; 4 pages.

*Primary Examiner* — Scott A. Smith
(74) *Attorney, Agent, or Firm* — St. Onge Steward Johnston & Reens LLC

(57) ABSTRACT

The invention discloses a portable tool having a housing with a gearhead, having a motor shaft which can be rotationally driven by a motor and which can be coupled via an eccentric coupling drive to a tool spindle for the drive thereof, wherein the tool spindle can be driven in a rotational oscillatory manner about the longitudinal axis thereof and is configured for accommodating a tool, wherein a motion-reversal drive is provided which is configured for converting an oscillating drive movement produced by the eccentric coupling drive into an oscillating output movement which has a direction of oscillation opposed to said drive movement. The motion-reversal drive is configured as an epicyclic gearing.

20 Claims, 4 Drawing Sheets

(56) References Cited

U.S. PATENT DOCUMENTS

| | | | |
|---|---|---|---|
| 6,634,437 B1 * | 10/2003 | Rudolph | 173/1 |
| 6,974,362 B2 | 12/2005 | Lindell et al. | |
| 7,108,077 B2 * | 9/2006 | Zaiser | 173/48 |
| 8,162,727 B2 * | 4/2012 | Zaiser | 451/357 |
| 8,381,833 B2 * | 2/2013 | Bernardi | 173/162.1 |
| 2005/0126803 A1 | 6/2005 | Zaiser | |
| 2005/0215385 A1 | 9/2005 | Spielmann et al. | |
| 2006/0073778 A1 | 4/2006 | Phillips et al. | |
| 2009/0311952 A1 | 12/2009 | Zaiser | |

FOREIGN PATENT DOCUMENTS

| | | |
|---|---|---|
| DE | 102004011617 A1 | 9/2005 |
| DE | 102007018466 A1 | 10/2008 |
| EP | 1358965 A2 | 11/2003 |
| GB | 2408708 A | 6/2006 |
| JP | H03104550 A | 5/1991 |
| WO | 2008128804 A1 | 10/2008 |

* cited by examiner

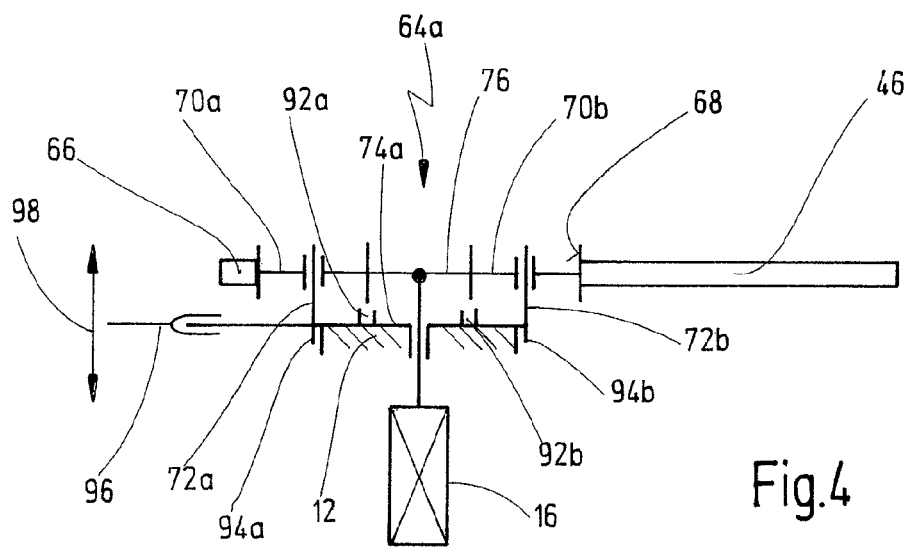
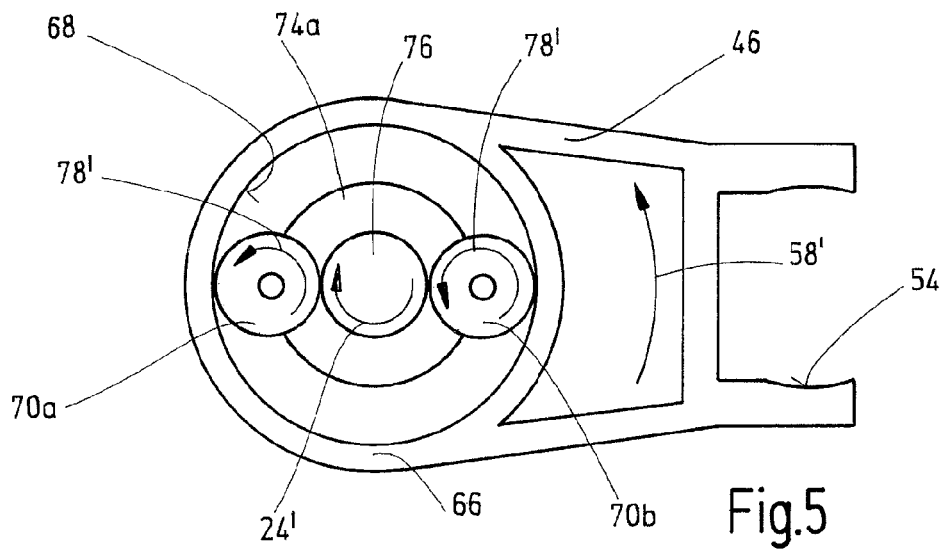
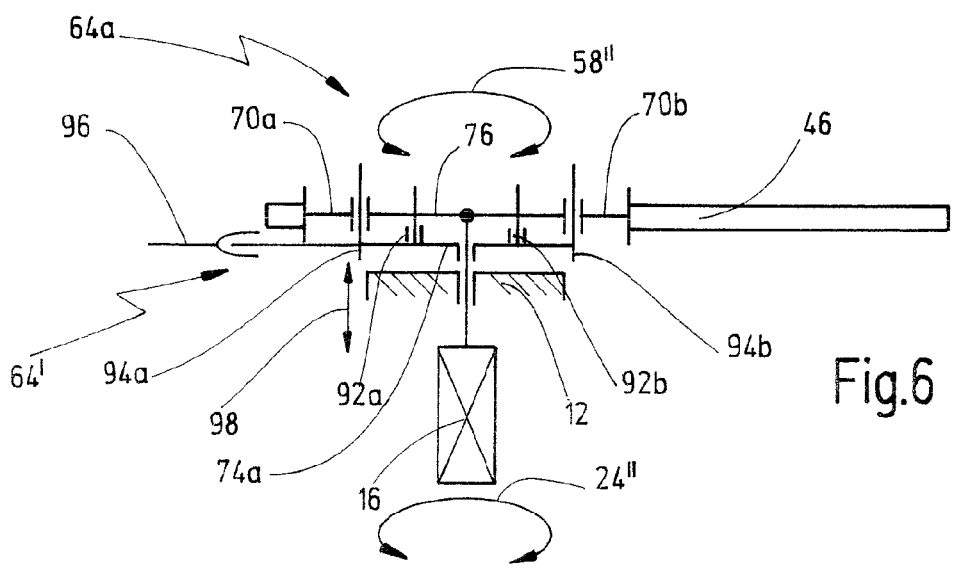

PORTABLE OSCILLATORY POWER TOOL WITH PLANETARY GEAR

CROSSREFERENCES TO RELATED APPLICATIONS

This application claims priority from German patent application 10 2010 046 629.8, filed on Sep. 17, 2010. The entire contents of this priority application is incorporated herein by reference.

BACKGROUND OF THE INVENTION

The invention relates to a portable power tool having a housing with a gearhead, having a motor shaft which can be rotationally driven by a motor and which can be coupled via an eccentric coupling drive to a tool spindle for the drive thereof, wherein the tool spindle can be driven in a rotational oscillatory manner about the longitudinal axis thereof and is designed for accommodating a tool.

Such a portable tool is known from WO 2008/128804 A1. This portable tool is a power tool having a drive unit for driving a drive shaft and an output shaft, on which a tool is accommodated. The rotary movement of the drive shaft can be transmitted to the drive shaft via an eccentric coupling device.

Such portable tools can be used, for instance, for the cutting or grinding of workpieces, wherein the oscillation movement of the tool can in principle make possible precise guidance at a high cutting or removal capacity.

It has been found that the use of such portable tools can be accompanied by vibration loads, which an operator can find to be annoying during prolonged use.

In this connection, WO 2008/128804 A1 proposes to provide a mass balance device for compensating for vibrations, said mass balance device performing a compensating movement opposed to the eccentric coupling movement produced by the eccentric coupling device.

It is thus possible in principle to reduce vibration loads, but the mass balance device involves increased construction cost and considerable extra weight. It has been found that the oscillating components of the eccentric coupling device, the output shaft coupled thereto and the oscillation tool fixed to the latter have a high mass and a considerable moment of inertia. For perceptible vibration compensation, these must accordingly be taken into account when designing the mass balance device and consequently give rise to an increased overall weight.

In view of this, it is a first object of the invention is to disclose a portable power tool comprising an oscillating drive, which can be operated ergonomically and with little fatigue.

It is a second object of the invention is to disclose a portable power tool comprising an oscillating drive, which can be operated at high performance.

It is a third object of the invention is to disclose a portable power tool comprising an oscillating drive having a simple a construction.

It is a forth object of the invention is to disclose a portable power tool comprising an oscillating drive which can be switched between different gears.

It is a fifth object of the invention is to disclose a portable power tool comprising an oscillating drive having low vibrations during operation.

SUMMARY OF THE INVENTION

According to one aspect these and other objects are achieved by a portable power tool comprising:

a housing having a gearhead;
a motor rotationally driving a motor shaft;
a tool spindle comprising a tool receptacle for receiving a tool;
an eccentric coupling drive being driven by said motor shaft, said eccentric coupling drive driving said tool spindle rotatingly oscillatingly about a longitudinal axis thereof; and
a motion-reversal drive being configured for converting an oscillating drive movement generated by said eccentric coupling drive into an oscillating output movement having a direction of oscillation opposed to a direction of oscillation of said eccentric coupling drive.

According to the invention, the drive movement itself is used in order to compensate for vibrations by some of the components participating in the drive transmission being moved in a direction opposed to the movement of some of the other components involved. Thus, at least partial extinction, as it were, of the vibrations perceived by an operator can be effected without the need for complicated additional devices which are affected by mass and follow on "blindly".

In other words, compared with portable tools known from the prior art, an interface at which the direction of rotation of the applied rotary oscillation is reversed is incorporated in the combination of tool/tool spindle and eccentric coupling drive.

According to a development of the invention, the motion-reversal drive, furthermore, is designed for the geared transmission of the drive movement.

In particular, the swivel angle of the tool resulting during an oscillation can be influenced in this way. It goes without saying that the opposed oscillating movements also have the same oscillation frequency.

The oscillating drive movement can be, for instance, "geared up", such that a large swivel angle is obtained at the tool, at which swivel angle in particular soft workpieces can be worked with high removal capacity or cutting capacity.

In addition, the "gearing down" of the drive movement can produce a small swivel angle of the tool. The capacity for working hard materials can therefore increase. In an oscillation tool having an especially small swivel angle, a user feels only small moments of reaction and the suitability of the portable tool for producing especially precise cuts or slots is further improved.

Furthermore, a transmission ratio between the oscillating drive movement and the oscillating output movement can be used in order to influence the torque M required for swivelling the tool without load via the resulting angular acceleration $\alpha$ at a given moment of inertia J of the participating components ($M = J \cdot \alpha$).

As a result of this measure, for example the torque $M_{an}$ linked with the oscillating drive movement can be matched to or at least brought closer to the torque $M_{ab}$ linked to the oscillating output movement. If $M_{an}$ and $M_{ab}$ are therefore virtually in agreement, that is to say if the respective products of moment of inertia and angular acceleration correspond, then, in view of the opposed direction of rotation, especially effective extinction of the oscillation vibrations occurring about the longitudinal axis of the tool spindle can be effected.

According to a further configuration of the invention, the eccentric coupling drive has a driver which is driven in an oscillating manner and can be coupled to the motion-reversal drive for the drive thereof.

This can result in a simple construction of the eccentric coupling drive. For producing the oscillating drive movement, the driver can be coupled directly or indirectly to the motor shaft.

In an advantageous development of the invention, the driver is designed as a swivellable driver fork, wherein the eccentric coupling drive has a revolving eccentric section which interacts with an arched surface of the driver fork.

The revolving eccentric section can in this case be arranged directly on the motor shaft or on an intermediate shaft driven by said motor shaft. The revolving eccentric section can interact with the driver fork, for instance, via a self-aligning bearing or a spherical bearing.

This measure has the advantage that the eccentric revolution of the eccentric section, at a very low construction cost, can be converted into a reciprocating movement of the driver in a plane in an especially simple manner.

According to a further aspect of the invention, the motion-reversal drive is designed as epicyclic gearing and is preferably arranged coaxially to the longitudinal axis.

In this way, the motion-reversal drive can be arranged directly on the tool spindle in a space-saving and weight-saving manner. The motion-reversal drive can thus be designed completely or virtually completely in a rotationally symmetrical or symmetrical manner to a main plane of the portable tool.

The moment of inertia of the motion-reversal drive with respect to the longitudinal axis of the tool spindle can therefore turn out to be especially low. This can thus produce, for instance, a cartridge-like, compact construction overall, such that the vibrations can be perceptibly reduced in the same or virtually the same construction space required by the portable tool, in particular by the gearhead.

According to a further configuration of the invention, the motion-reversal drive has a ring gear which is coupled to the driver for conjoint rotation.

In particular if the driver is embodied as a driver fork, the ring gear can be coupled to the latter or else can be embodied in one piece therewith. Such component integration can help to minimize the number of parts and simplify the production and assembly of the portable tool.

According to a further aspect of the invention, the motion-reversal drive has a sun gear which is coupled to the tool spindle for conjoint rotation, in particular is embodied in one piece therewith.

The tool spindle together with the sun gear can therefore be formed, for instance, from a solid shaft material and have high robustness.

With a configuration in which both a ring gear coupled to the driver and a sun gear which is arranged on the tool spindle are provided, a configuration which permits gearing up can be obtained, while taking into account the other components of the epicyclic gearing, at least a planet gear and a planet carrier. In other words, a certain drive angle which is produced at the driver is converted into a larger output angle which is applied at the tool spindle.

In an alternative configuration of the invention, the motion-reversal drive has a sun gear which is coupled to the driver for conjoint rotation.

In this way, the oscillating drive movement can be initiated in the epicyclic gearing of the motion-reversal drive via the sun gear, such that in principle other transmission ratios can be produced. The sun gear can in this case be embodied in one piece with the driver or else be fixed thereto via a suitable connection.

This measure is developed by the motion-reversal drive having a ring gear which is coupled to the tool spindle for conjoint rotation.

The ring gear can therefore be designed, for instance, in a manner comparable to a coupling cage or a coupling drum, wherein the tool spin follows on the output side.

With epicyclic gearing whose sun gear is coupled to the driver for conjoint rotation and whose ring gear is arranged on the tool spindle for conjoint rotation, gearing down can be effected in principle.

A certain swivel angle which is produced by the eccentric coupling drive at the sun gear is converted into an output movement of the tool spindle, said output movement having a smaller swivel angle.

In an advantageous development of the invention, the motion-reversal drive has a planet carrier which can be coupled to the housing for conjoint rotation.

The planet carrier can therefore be embodied as part of the housing or else be fixed thereto. The construction of the portable tool can be further simplified.

According to a further configuration of the invention, the motion-reversal drive has a plurality of planet gears, in particular three planet gears.

The configuration of the epicyclic gearing having three planet gears can simplify the bearing arrangement required for the sun gear and the ring gear. A plurality of planet gears enables forces to be split up, such that, for instance, linear contact can occur at several points during the force transmission, where every individual point of linear contact only has to transmit part of the total force. Depending on the desired transmission ratio and with due allowance for other boundary design conditions, two or four planet gears or another number of planet gears can be used.

According to a further aspect of the invention, the motion-reversal drive is designed for converting the drive movement into an output movement with opposed direction of rotation in a first position and for converting the drive movement into an output movement with the same direction of rotation in a second position.

In particular epicyclic gearing can be used for both the positive and negative transmission of movements without a large outlay in terms of construction or control.

In principle, for instance in a simple single-stage planet gear set, a total of six different operating modes can be achieved by varying the drive element, the output element and the fixed element, said operating modes partly having a positive transmission ratio and partly having a negative transmission ratio.

For instance, if the ring gear is fixed, the drive can be initiated via the planet carrier or the sun gear, and the output is correspondingly effected in the process either via the sun gear or the planet carrier. Both operating modes have a positive transmission ratio.

If a sun gear is fixed, the drive can be effected via either the ring gear or the planet carrier. Accordingly, the planet carrier or the ring gear can be used as output element. These two operating modes also have, in principle, a positive transmission ratio.

On the other hand, if the planet carrier is fixed, negative transmission ratios, that is to say an output movement with a direction of rotation opposed to the drive movement, can be achieved. In this case, the drive can be effected via either the sun gear or the ring gear and accordingly the output can be effected via the ring gear or the sun gear.

With suitable control elements, some of these operating modes or a plurality of these operating modes can be selectively activated in only one configuration. The control elements can be, for example, control slides or brake bands, that is to say elements which are designed for optionally fixing or releasing components of the planet stage.

According to a development of the invention, a control element is provided which is designed for displacing the planet carrier between a first position in which the planet carrier is coupled to the housing in a rotationally fixed manner and a second position in which the planet carrier can be rotated or swivelled relative to the housing.

In this way, the assignment of the planet carrier relative to the housing can be deliberately used in order to activate various operating modes of the motion-reversal drive. If the planet carrier is shifted into the second position, this can result in underdetermination at the epicyclic gearing which can be used, for instance, as an idling function. In the process, the drive movement would "fizzle out", as it were, at the input of the epicyclic gearing and consequently would not lead to an output movement.

This measure is developed by the planet carrier, in the second position, being furthermore designed for locking the motion-reversal drive in order to directly convert the drive movement into the output movement.

In this way, the epicyclic gearing can be bridged, such that the drive movement 1:1 is converted into the output movement, and thus both movements have the same direction of rotation.

Thus, furthermore, in addition to a change in the assignment of the direction of rotation of the drive movement to the direction of rotation of the output movement, a sudden change in the transmission ratio can also be produced, since epicyclic gearing in "normal operation" has in principle a transmission ratio differing from a 1:1 transmission ratio.

It goes without saying that the abovementioned features and the features still to be explained below can be used not only in the respectively specified combination but rather also in other combinations or on their own without departing from the scope of the present invention.

BRIEF DESCRIPTION OF THE DRAWINGS

Further features and advantages of the invention can be gathered from the description below of preferred exemplary embodiments with reference to the drawing, in which:

FIG. 4 shows a schematic side view of a gearing arrangement of a portable tool according to the invention;

FIG. 5 shows a plan view of the arrangement according to FIG. 4;

FIG. 6 shows an arrangement according to FIG. 4 in a second operating position;

DETAILED DESCRIPTION OF THE PREFERRED EMBODIMENTS

Figure 1:
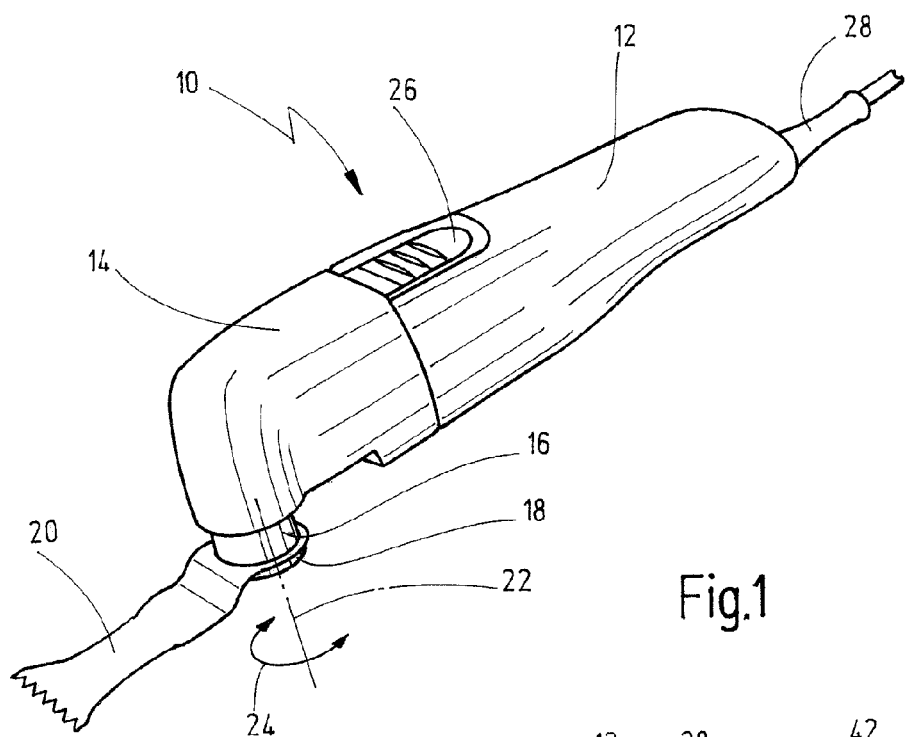
FIG. 1 shows a perspective illustration of a portable tool according to the invention.

A portable tool according to the invention is shown in FIG. 1 and designated overall by 10.

The portable tool 10 has a housing 12 with a gearhead 14. Accommodated on the gearhead 14 is a tool spindle 16, on the end of which a tool 20 is accommodated via a tool fastening 18.

During the operation of the portable tool 10, the tool spindle can be swivelled at a high frequency, for instance 5000 to 30000 oscillations per minute, by a small angle, for instance 0.5 degrees to 7 degrees, about its longitudinal axis 22 for driving the tool 20. This rotational oscillatory movement is indicated by a double arrow designated by 24.

In the present case, the tool 20 is a cutting tool which, starting from a tool holder 88 on the tool spindle 16, extends substantially in a longitudinal direction as a flat piece, a cutting geometry being arranged on an end remote from the tool spindle 16. Furthermore, the tool 20 can have a central narrowed portion, as indicated in FIG. 1, and be provided with an offset, cf. FIG. 2. Depending on the application and intended use, other tool geometries are conceivable.

Such portable tools having a rotational oscillatory drive can be used for cutting, but likewise also for grinding, sawing, for smoothing or polishing applications. The characteristic of the drive, namely small swivel angle at high swivelling frequency, permits precise and effortless work, in particular also in confined spatial conditions, for instance during flush cutting at angles or in corner regions.

An operator can pick up the portable tool 10 at a gripping region on the housing 12 and optionally activate or deactivate it via an actuating switch 26. The portable tool 10 can be supplied with energy for driving a drive motor via a supply line 28. It goes without saying that the portable tool 10 can also be optionally operated independently of a line and in particular can be supplied with energy by means of batteries. In addition, a drive by means of compressed air is also conceivable.

During operation of the portable tool 10, vibrations may occur as a result of the measures for producing the rotary oscillation movement of the tool 20, and these vibrations may possibly be adversely felt by the operator. An arrangement which can help to minimize such vibration exposure and can consequently enable the operator to work ergonomically and continuously for long periods is described with reference to FIGS. 2 and 3.

Figure 2:
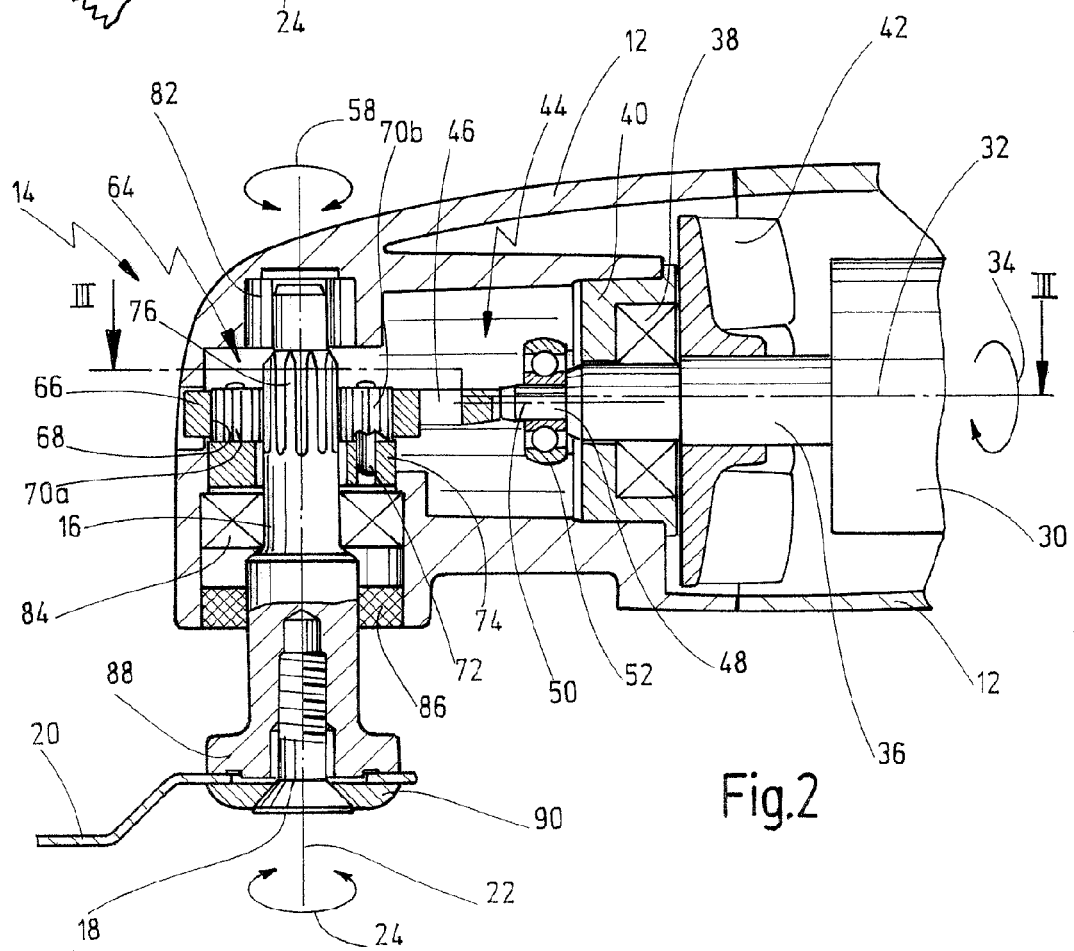
FIG. 2 shows a section through the portable tool according to FIG. 1 in the region of the gearhead.

The housing 12 of the portable tool 10 in the region of the gearhead 14 is shown sectioned in FIG. 2. A motor 30, which can be designed, for instance, as an electric motor, serves to drive the portable tool 10. The motor 30 is designed to rotationally drive a motor shaft 36 about a center axis 32, as indicated by an arrow designated by 34. The motor shaft 36 is mounted via a motor bearing 38, which is fixed to the gearhead 14 of the housing 12 via an end shield 40. Furthermore, a fan wheel 42 is accommodated on the motor shaft 36, and this fan wheel 42 can serve to supply the motor 30 and other components of the portable tool 10 that are arranged in the gearhead 14 with air during operation.

For producing the rotational oscillatory output movement of the tool spindle 16, the motor shaft 36 is coupled to an eccentric coupling drive 44. This coupling can be directly effected, cf. FIG. 2 and FIG. 3, or else indirectly via intermediate shafts or the like. An intermediate shaft can in particular be of advantage, for instance, when a relative arrangement between motor 30 with motor shaft 36 and the tool spindle 16 is desired which differs from the relative orthogonal arrangement shown in FIG. 2 with intersecting axes 22, 32.

The motor shaft 36 is coupled to a driver 46 via an eccentric section 48. The eccentric section 48 has an eccentric axis 50 which is offset from the center axis 32 of the motor shaft 36, cf. also FIG. 3. The driver 46 is therefore set in a swivelling motion during the revolution of the eccentric section 48, which is produced by a rotation of the motor shaft 36.

The coupling between the eccentric section 48 and the driver 46 is effected via an eccentric bearing 52, which preferably has a spherical outer surface which interacts with an arched surface 54 of the driver 46.

Figure 3:
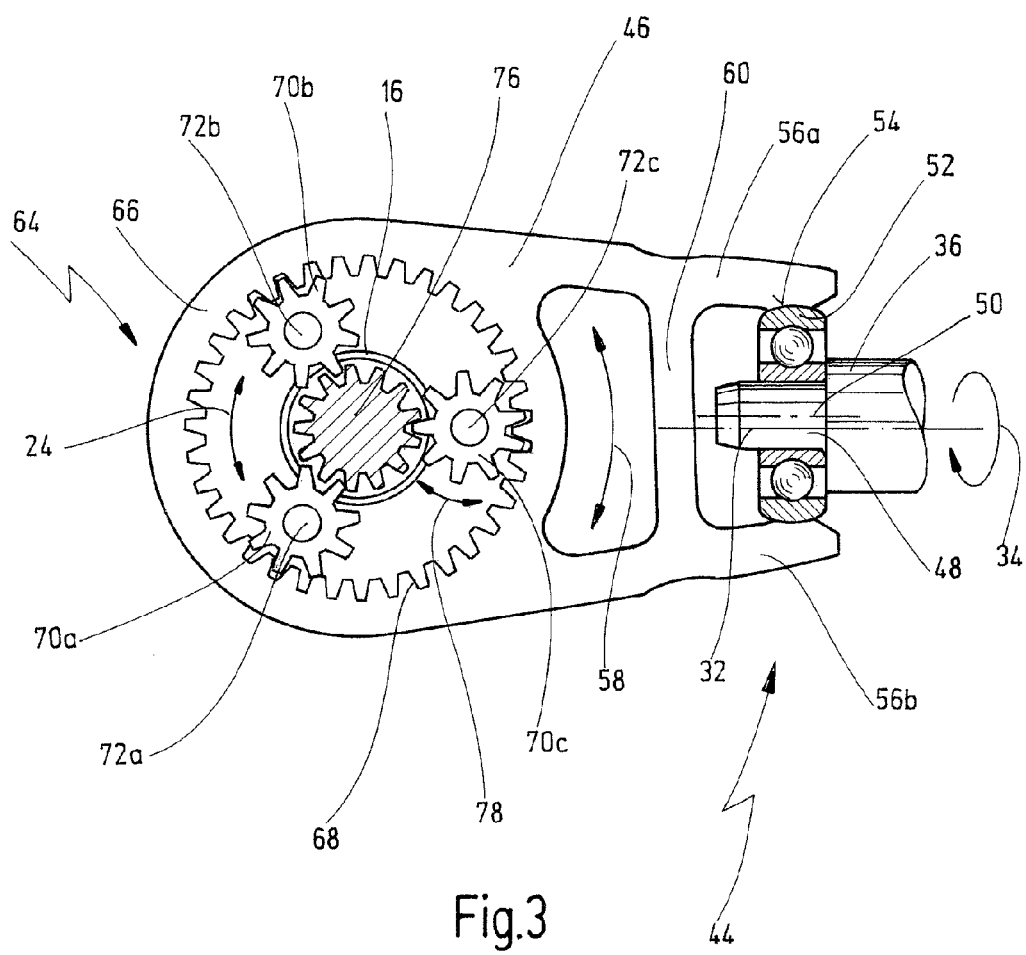
FIG. 3 shows a simplified illustration of a section through the portable tool according to FIG. 2 along line III-III.

The driver 46 is of fork-shaped design and is arranged to be swivellable about the longitudinal axis 22, cf. FIG. 3. On its side facing the eccentric section 48 of the motor shaft 36, the driver 46 has two fork arms 56a, 56b which are connected via a web 60. Arranged on the inner sides of the fork arms 56a, 56b is the arched surface 54, on which the eccentric section 48 acts via the eccentric bearing 52.

The swivelling movement of the driver 46 effected by the revolution of the eccentric section 48 is indicated in FIGS. 2 and 3 by a double arrow designated by 58.

The revolution of the eccentric section 48 and the reciprocating movement of the driver 46 produce lateral impulses in the plane shown in FIG. 3, and these impulses can be reflected in a vibration load which can be felt by the operator. According to the invention, provision is now made to couple the eccentric coupling drive 44 to a motion-reversal drive 64, such that a movement opposed to the movement of the driver 46 is obtained at the tool spindle 16. This can help to compensate for these vibrations, such that the vibration level which arises for the operator can be noticeably reduced.

For this purpose, the motion-reversal drive 64 is designed as epicyclic gearing. In the configuration shown in FIGS. 2 and 3, a ring gear 66 is provided which is jointly formed in one piece with the driver 46. The ring gear 66 therefore serves as a gearing input and transmits the swivelling movement effected by the eccentric coupling drive 44, cf. arrow 58, to a plurality of planet gears 70a, 70b, 70c by means of an inwardly directed tooth system 68.

The planet gears 70a, 70b, 70c are mounted on planet spindles 72a, 72b, 72c which are accommodated on a planet carrier 74. The planet carrier 74 is fixed relative to the housing 12 of the portable tool 10. The planet gears 70a, 70b, 70c can therefore in principle be rotated back and forth about the planet spindles 72a, 72b, 72c, but are not displaced jointly with the planet carrier 74 relative to the housing 12. By way of example, the swivelling movement of the planet gear 70c is indicated in FIG. 3 by an arrow designated by 78.

Finally, the drive force or the drive torque is transmitted to a sun gear 76, which is formed in FIG. 2 on the tool spindle 16. The movement of the sun gear 76 leads to a swivelling movement of the tool spindle 16, as indicated by the arrow 24 in FIG. 2.

The tooth system of the sun gear 76 is arranged on the tool spindle 16 between a first bearing 82 and a second bearing 84. Furthermore, a seal 86, for instance a rotary shaft seal, is provided at the point at which the tool spindle 16 comes out of the gearhead 14 of the housing 12 of the portable tool 10.

On the tool-side end, the tool spindle 16 has a tool holder 88, against which the tool 20 bears and is fixed by means of a fastening ring 90 via the tool fastening 18. In this case, the tool 20 can be fastened to the tool holder 88 in a positive-locking manner, for instance via a splined receptacle, in a frictional manner or else in a combined positive-locking and frictional manner. In the present case, the tool fastening 18 is shown in the form of a fastening screw having a tapered screw head.

The configuration of the motion-reversal drive 64 shown in FIG. 3 has the following numbers of teeth which characterize the transmission ratio: the ring gear 66 is provided with 35 inwardly directed teeth ($z_H$=−35). Each of the planet gears 70a, 70b, 70c has 9 teeth ($z_P$=9). The sun gear 76 is provided with a total of 13 teeth ($z_S$=13). These tooth system ratios, merely cited by way of example, result in a transmission ratio between the drive, the ring gear 66 and the output of the sun gear 76 of approximately i=−0.37.

In other words, for example a swivel angle (cf. arrow 58) of approximately two degrees initiated in the driver 46 is therefore converted into a swivel angle of the tool spindle 16 or of the tool 20 fastened thereto (cf. arrow 24) of approximately 5.4 degrees, the swivelling movements being opposed to one another.

Balancing of the mass or moment of inertia in such a way as to minimize vibrations can therefore be effected by the movements in opposite directions, and the resulting swivel angle of the tool 20 can likewise be adapted to specific conditions of use by the transmission ratio.

The above-mentioned values are given merely by way of example; it goes without saying that other transmission ratios or tooth system ratios can be used depending on a desired swivel angle and boundary design conditions, such as, for instance, construction space requirement, existing construction space in the housing, dimensions of the driver 46 and existing eccentricity of the eccentric section 48. Furthermore, the drive or output capacity to be expected, production parameters, such as, for example, achievable tooth system grades, the load-bearing capacity of the materials used, and a desired level of smooth running have an effect on the configuration of the tooth system.

In FIG. 3, the tooth systems of the sun gear 76, the planet gears 70 and the ring gear 66 are each embodied fully over the circumference of the gears. Considering the fact that the planet stage used is primarily used in a swivelling operation and not in a rotary operation, it may be appropriate to embody the tooth systems, in contrast to the illustration in FIG. 3, only partly in the regions in which the gears are actually in contact.

Alternatively, full embodiment of the tooth systems can bring advantages during production and fitting. Firstly, recourse may be had to highly available standard parts and established production processes for producing completely toothed gears. In addition, the fitting of fully toothed gears can be simplified, since as a rule no special arrangement relative to one another is necessary.

Figure 7:
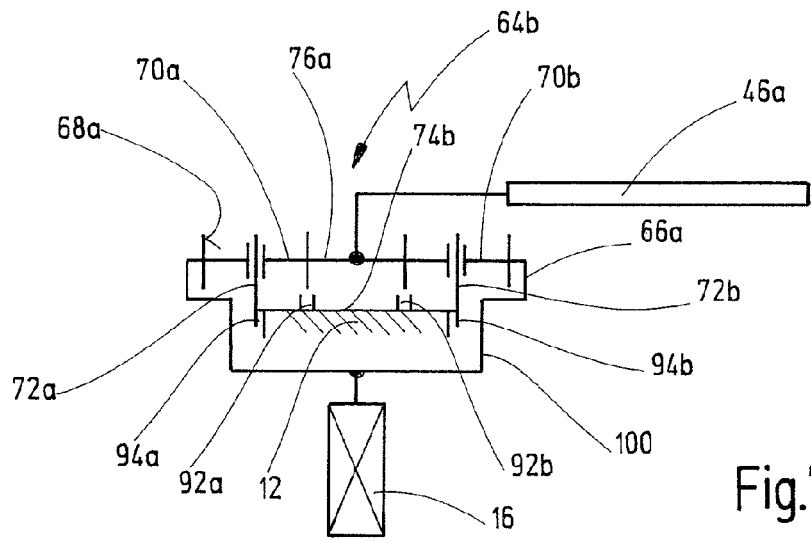
FIG. 7 shows a schematic side view of an alternative gearing arrangement of a portable tool according to the invention.
Figure 8:
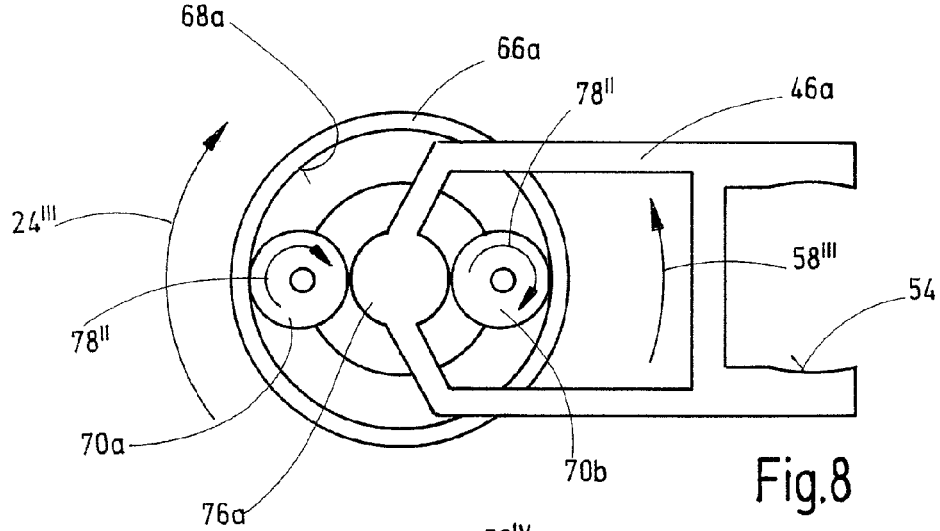
FIG. 8 shows a plan view of the arrangement according to FIG. 7.
Figure 9:
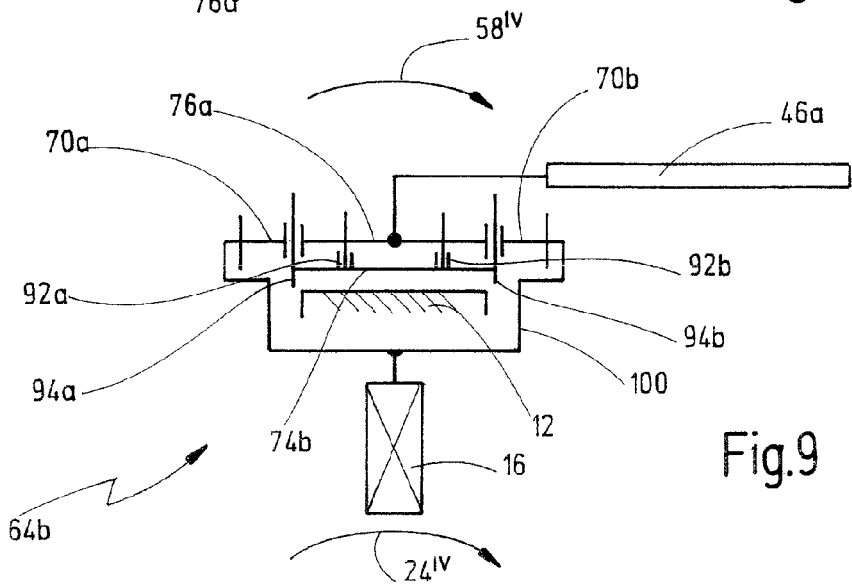
FIG. 9 shows the arrangement according to FIG. 7 in a second operating position.

Alternative gearing arrangements for use in the portable tool 10 which can have expanded functionality are shown schematically in FIGS. 4 to 6 and in FIGS. 7 to 9.

Shown in FIGS. 4 and 5 in schematic illustration is a motion-reversal drive 64a, the construction of which corresponds in principle to the motion-reversal drive 64 from FIGS. 2 and 3.

Indicated in this case is a fork-shaped driver 46 which can be driven, for instance, via an eccentric section 48 (not shown). The driver 46 at the same time has the ring gear 66.

The reversal of the direction of rotation between drive and output accompanying the operation of the motion-reversal drive 64a is explained by way of example with reference to FIG. 5.

For the purpose of illustration, only a half interval of a swivelling interval as drive movement is shown by the arrow 58' here. In FIG. 5, the driver 46 and thus the tooth system 68 of the ring gear 66 are swivelled anticlockwise. In the process, the ring gear 66 acts on the planet gears 70a, 70b, which are driven along in the same direction by said ring gear 66. The resulting swivelling of the planet gears 70a, 70b in the anticlockwise direction is indicated by the arrows 78'. The planet gears 70a, 70b mesh with the sun gear 76, which is likewise externally toothed. Consequently, the sun gear 76 is swivelled or rotated clockwise. A motion reversal has thus taken place.

If the aim is to effect as far as possible only a small "transmission ratio" between the drive oscillation and the output oscillation, the number of teeth of the sun gear 76 can be matched, wherever possible, to the number of teeth of the ring gear 66, within the technological limits. On the other hand, if a large "transmission ratio" is desired, the number of teeth of the sun gear 26 can be kept significantly smaller than the number of teeth of the ring gear 66.

Furthermore, indicated in FIG. 4 by 92a, 92b and 94a, 94b are latching elements which are designed for selectively fixing the planet carrier 74a to the housing 12 or else for releasing it from the latter and for locking the motion-reversal drive 64a. Furthermore, a control element 96 is provided for this purpose, which control element 96 is intended for being able to displace the planet carrier 74a as required, as indicated by the double arrow designated by 98. The control element 96 can be designed, for instance, as a shift fork which can be actuated from outside by the operator through the housing 12.

Here, FIG. 4 shows the planet carrier 74a in a first position, in which the motion-reversal drive 64a is active and an opposing transmission ratio is produced between the drive oscillation and the output oscillation.

In contrast, the planet carrier 74a in FIG. 6 is shown in a second position, in which the latching elements 94a, 94b are released from the housing 12 and therefore a rotation of the planet carrier 74a relative to the housing 12 of the portable tool 10 is made possible. At the same time, the latching elements 92a, 92b are shifted into the tooth system of the planet stage in order to lock the latter. The motion-reversal drive 64a in FIG. 6 is therefore "bridged", as it were, such that an oscillating drive movement 1:1 is converted into an oscillating output movement. This is symbolized by the arrows 58" and 24". In other words, a certain swivel angle, which is applied at the driver 46, is converted in the second position into an equidirectional, just as large swivel angle of the tool spindle 16 or of the tool 20.

A two-speed functionality can thus easily be provided.

The gearing arrangement shown in FIG. 7 and having a motion-reversal drive 64b can also be expanded with such a functionality, as indicated in FIG. 9. In this case, the control element 96 for displacing the planet carrier 74b has not been shown for reasons of clarity. The motion-reversal drive 64b is also locked in FIG. 9, such that a direct 1:1 transmission ratio between the drive movement at the driver 46 and the output movement at the tool spindle 16 is effected, cf. the direction arrows $58^{IV}$ and $24^{IV}$ acting in the same direction.

In addition, FIG. 7 and FIG. 8 illustrate a configuration in which, in the motion-reversal mode, the drive oscillation at the driver 46 is converted into an output oscillation at the tool spindle 16, or at the tool 20 fixed thereto, with a smaller swivel angle.

Here, too, the motion-reversal drive 64b is designed as epicyclic gearing, the drive via the driver 46a now being effected on the sun gear 76a. The sun gear 76a acts on the planet gears 70a, 70b, which are mounted on planet spindles 72a, 72b which are fixed to the planet carrier 74b. In FIG. 7, the planet carrier 74b is coupled to the housing 12 in a rotationally fixed manner.

In FIG. 8, a half interval of a swivelling interval is again indicated. The drive movement is in this case embodied by the arrow 58'''. The driver 46a and the sun gear 76a are therefore rotated anticlockwise. This directly produces a clockwise rotation of the planet gears 70a, 70b, cf. arrows 78'''. The ring gear 66a is coupled to the planet gears 70a, 70b via the tooth system 68a and is linked on the output side to the tool spindle 16. The drive by the planet gears 70a, 70b swivels the ring gear 66a and thus the tool spindle 16 in the clockwise direction, cf. the arrow 24'''.

If the number of teeth $z_H=-35$, $z_S=13$ and $z_P=9$ proposed by way of example with respect to FIGS. 2 and 3 is also taken as a basis in this configuration, a transmission ratio between drive and output of approximately $i=-2.7$ is obtained. In other words, a swivel angle at the driver 46a of, for instance, 10 degrees is converted into a swivel angle of the tool spindle 16, and of the tool 20 fixed thereto, of 3.7 degrees, the swivelling movements being opposed. Here, too, the vibrations which can be felt by the operator can be effectively reduced.

A portable tool for the rotational oscillatory drive of a tool is specified within the scope of the invention, which portable tool, with little extra construction cost, and without impairing the performance, can make it possible to work ergonomically and free of fatigue and is suitable in particular for applications which require prolonged use.

What is claimed is:

1. A portable power tool comprising:
   a housing having a gearhead;
   a motor rotationally driving a motor shaft;
   a tool spindle comprising a tool receptacle for receiving a tool;
   an eccentric coupling drive being driven by said motor shaft, said eccentric coupling drive driving said tool spindle rotatingly oscillatingly about a longitudinal axis thereof; and
   a motion-reversal drive being configured for converting an oscillating drive movement generated by said eccentric coupling drive into an oscillating output movement having a direction of oscillation opposed to a direction of oscillation of said eccentric coupling drive;
   wherein said eccentric coupling drive comprises a revolving eccentric being rotatingly driven by said motor and engaging an arched surface of a swivellable driver fork driving said motion-reversal drive;
   wherein said motion-reversal drive is configured as an epicyclic gearing.

2. The portable tool of claim 1, wherein said motion-reversal drive is arranged coaxially to a longitudinal axis of said tool spindle.

3. The portable tool of claim 1, wherein said motion-reversal drive comprises a ring gear being coupled to said swivellable driver fork for conjoint rotation.

4. The portable tool of claim 1, wherein said motion-reversal drive comprises a sun gear being coupled to said tool spindle for conjoint rotation.

5. The portable tool of claim 4, wherein said sun gear is configured integral with said tool spindle.

6. The portable tool of claim 1, wherein said motion-reversal drive comprises a sun gear being coupled to said swivellable driver fork for conjoint rotation.

7. The portable tool of claim 1, wherein said motion-reversal drive comprises a ring gear being coupled to said tool spindle for conjoint rotation.

8. The portable tool of claim 1, wherein said motion-reversal drive comprises a planet carrier which can be coupled to said housing for conjoint rotation.

9. The portable tool of claim 1, wherein said motion-reversal drive comprises a plurality of planet gears.

10. The portable tool of claim 9, wherein said motion-reversal drive comprises three planet gears.

11. A portable power tool comprising:
    a housing having a gearhead;
    a motor rotationally driving a motor shaft;
    a tool spindle comprising a tool receptacle for receiving a tool;
    an eccentric coupling drive being driven by said motor shaft, said eccentric coupling drive driving said tool spindle rotatingly oscillatingly about a longitudinal axis thereof; and
    a motion-reversal drive being configured as an epicyclic gearing configured for converting an oscillating drive movement generated by said eccentric coupling drive into an oscillating output movement having a direction of oscillation opposed to a direction of oscillation of said eccentric coupling drive.

12. The portable tool of claim 11, wherein said eccentric coupling drive further comprises a driver being oscillatingly driven and being coupled to said motion-reversal drive for driving same.

13. The portable tool of claim 12, wherein said driver is configured as a swivellable driver fork, and wherein said eccentric coupling drive comprises a revolving eccentric section engaging an arched surface of said driver fork.

14. The portable tool of claim 11, wherein said motion-reversal drive further comprises a control element having a first position and a second position, wherein said motion-reversal is configured for converting a driving movement into an output movement having a direction of oscillation opposed to a direction of oscillation of said driving movement when said control element is in said first position, and for converting the driving movement into an output movement having the same direction of oscillation when said control element is in said second position.

15. The portable tool of claim 14, wherein said epicyclic gearing further comprises a planet carrier cooperating with said control element, said control element being configured for displacing said planet carrier between said first and second positions.

16. The portable tool of claim 15, wherein said planet carrier, when being in said second position, is configured for locking said motion-reversal drive for directly converting a driving movement into an output movement.

17. The portable tool of claim 15, wherein said planet carrier is coupled to said housing in a rotationally fixed manner when said control element is in said first position and is rotatable relative to said housing when said control element is in said second position.

18. A portable power tool comprising:
a housing having a gearhead;
a motor rotationally driving a motor shaft;
a tool spindle comprising a tool receptacle for receiving a tool;
an eccentric coupling drive being driven by said motor shaft, said eccentric coupling drive driving said tool spindle rotatingly oscillatingly about a longitudinal axis thereof; and
a motion-reversal drive being configured for converting an oscillating drive movement generated by said eccentric coupling drive into an oscillating output movement having a direction of oscillation opposed to a direction of oscillation of said eccentric coupling drive.

19. The portable tool of claim 18, wherein said motion-reversal drive is configured as a motion-reversal gear.

20. The portable tool of claim 18, wherein said motion-reversal drive is configured as an epicyclic gearing.

* * * * *